(12) United States Patent
Gold

(10) Patent No.: US 6,662,284 B2
(45) Date of Patent: Dec. 9, 2003

(54) COMPUTER APPARATUS, METHOD AND MEMORY INCLUDING LICENSE KEY

(75) Inventor: Stephen Gold, Fort Collins, CO (US)

(73) Assignee: Hewlett-Packard Development Company, L.C., Palo Alto, CA (US)

( * ) Notice: Subject to any disclaimer, the term of this patent is extended or adjusted under 35 U.S.C. 154(b) by 154 days.

(21) Appl. No.: 09/785,239

(22) Filed: Feb. 20, 2001

(65) Prior Publication Data

US 2002/0116589 A1 Aug. 22, 2002

(51) Int. Cl.⁷ .............................................. G06F 12/00
(52) U.S. Cl. ............................ 711/163; 707/9; 707/10; 711/111; 711/154; 713/1; 713/2; 713/100
(58) Field of Search ........................ 369/30.01; 705/59; 707/9, 10; 709/320, 321, 325; 710/36, 104, 200; 711/111, 112, 114, 154, 163, 170, 173; 713/1, 2, 100, 189, 200; 345/735, 866, 965, 966

(56) References Cited

U.S. PATENT DOCUMENTS

| 5,473,692 A | * | 12/1995 | Davis ........................... 705/59 |
| 5,479,612 A | | 12/1995 | Kenton et al. ............... 713/200 |
| 5,713,009 A | * | 1/1998 | DeRosa et al. ................. 713/2 |
| RE35,839 E | * | 7/1998 | Asai et al. ....................... 380/3 |
| 5,784,703 A | * | 7/1998 | Muraoka et al. ............. 711/173 |
| 5,822,565 A | * | 10/1998 | DeRosa et al. ................ 703/24 |
| 6,023,766 A | * | 2/2000 | Yamamura ................... 713/201 |
| 6,493,749 B2 | * | 12/2002 | Paxhia et al. ............... 709/220 |
| 2001/0014883 A1 | * | 8/2001 | Yamane et al. ................ 705/51 |
| 2001/0044897 A1 | * | 11/2001 | Ishiguro et al. ............. 713/171 |
| 2002/0042892 A1 | * | 4/2002 | Gold .............................. 714/6 |
| 2002/0083319 A1 | * | 6/2002 | Ishiguro et al. ............. 713/168 |
| 2002/0108054 A1 | * | 8/2002 | Moore et al. ................ 713/200 |
| 2002/0188704 A1 | * | 12/2002 | Gold et al. .................. 709/221 |

FOREIGN PATENT DOCUMENTS

| WO | 97/45780 | 12/1997 |
| WO | 01/16674 A1 | 3/2001 |

* cited by examiner

Primary Examiner—Donald Sparks
Assistant Examiner—Christian P. Chace

(57) ABSTRACT

A headless computer entity has a license key data stored on a raw disk sector separate from a system disk and a data disk. The license key data control the available data storage capacity within the headless computer entity, and protect the computer entity from unauthorized upgrade to a higher product specification. The license key data are encrypted and protected from hacking via software updates introduced on an external data carrier, such as a CD ROM.

18 Claims, 13 Drawing Sheets

| Product code | Data storage capacity (data disk) | Disk configuration |
|---|---|---|
| PC25<br>PC100 | 25GB<br>40GB | Single physical disk, 2 logical disks |
| PC300 | 300GB | 5 physical disks, 2 logical disk, data disk is a RAID 5 volume |
| PC1000 | 700 GB | 3 logical disks, on 12 physical disks, single RAID 5 volume on 11 physical disks |

Fig. 13

COMPUTER APPARATUS, METHOD AND MEMORY INCLUDING LICENSE KEY

FIELD OF THE INVENTION

The present invention relates to computer apparatus, method, and memory including a license key and more particularly to a license key including an indicator of licensed user capacity.

BACKGROUND TO THE INVENTION

Certain known computer entities, e.g., headless computer entities, have fixed data storage disk configurations of a pre-determined data capacity. Customers cannot upgrade the disk configuration and increase the amount of application data held on such computer entities, once purchased. This helps to protect against customer mis-configuration of the computer entity, and also protects the manufacturer's pricing scheme where such computer entities are sold with price dependent on data storage capacity.

A known headless computer entity (also known as "headless appliances") comprises a data-processor, memory, a plurality input/output ports or the like, and an operating system. Headless appliances are generally designed without user interfaces, and lack a keyboard, pointing device e.g. mouse or track ball, and the typical visual display monitor, although headless appliances often include a small display, e.g., an LCD, having a few lines of alpha-numeric characters. This has the advantages of (1) reducing the cost of ownership, since the cost of a user interface hardware need not be borne by the purchaser, and (2) inhibiting interference with the operation of the appliance.

Human administrators are conventionally allowed only very limited access to a headless computer entity for maintenance; however, in some cases no user maintenance is permitted.

Advances in hard disk drive technology have increased the available data capacity in hard disk drives to the extent that smaller capacity disk drives of 1 GByte, and below are becoming increasingly rare, whereas higher capacity hard disk drives of 10 GBytes and above have seen substantial price reductions.

SUMMARY OF THE INVENTION

One aspect of the invention relates to a memory for a computer, wherein the memory comprises a file system including a program storing an operating system for controlling operation of the computer. A license key resident outside the file system includes an indication of licensed user storage capacity of the computer. The license key is incapable of being changed during operation of the computer. The license key is also incapable of being changed as result of changes of the file system.

Another aspect of the invention relates to a computer comprising a processor, and a memory. The memory includes a file system and a license key including an indication of licensed user storage capacity of the computer. The processor is arranged to be coupled with the memory for (1) causing the file system to control operation of the processor and (2) preventing further operation of the processor in response to the licensed user storage capacity being exceeded or substantially exceeded. The processor and memory are arranged so the license key is incapable of being changed during operation of the computer. The processor and memory are also arranged so the license key is incapable of being changed as result of changes of the file system.

The license key is preferably encrypted and the computer is frequently a headless computer.

In a preferred embodiment, a display coupled with the processor and memory displays a message in response to the licensed user capacity being exceeded or substantially exceeded.

The computer and memory are preferably arranged so that during boot-up the processor is arranged for (1) comparing the actual and licensed capacity and (2) preventing further operation of the processor after boot-up in response to the comparison indicating the actual capacity exceeding or substantially exceeding the licensed capacity.

The computer and memory are also preferably arranged so that further operation of the processor is prevented in response to the actual capacity being substantially different from the licensed capacity.

A further aspect of the invention relates to a method of operating a computer including a processor and a memory, wherein the memory includes a file system and a license key including an indication of licensed user storage capacity of the computer. The method comprises causing the file system to control operation of the processor. Further operation of the processor is prevented in response to the licensed user storage capacity being exceeded or substantially exceeded. The license key is prevented from being changed during operation of the computer and/or as a result of changes of the computer file system.

An additional aspect of the invention relates to a method of operating a computer entity having an actual configuration, a licensed configuration, plural logical disks, and an applications program. The method comprises the steps of determining the actual configuration and storing license data describing the licensed configuration of the computer entity. A determination is made of (1) whether the determined actual configuration of the computer entity lies within the licensed configuration, within predetermined limits, and (2) the number of logical disks for which the application program stores application data by interrogating the applications program of the computer entity. The predetermined number of logical disks used by the applications program is compared with a licensed number of logical disks according to the licensed data. The applications program is reconfigured to use the same number of logical disks as the licensed number of logical disks in response to the comparison indicating the predetermined number of logical disks in the applications program exceeds or substantially exceeds the licensed number of logical disks according to the licensed data.

Preferably, the applications program is reconfigured to use the same number of logical disks as the licensed number of logical disks in response to the comparison indicating the predetermined number of logical disks in the application program differs from the licensed number of logical disks by more than a predetermined percentage.

An added aspect of the invention relates to a method of controlling a computer entity having at least one data processor, at least one storage device including disks for which licenses are required, and at least one applications program storing application data about the disks. The method comprises determining the configuration of the disks by checking the applications program and comparing the application disk configuration with a licensed configuration of the disks. The configuration settings of the applications program are changed to correspond with the licensed logical disk configuration of the computer entity in response to the applications program being configured to use a logical disk configuration which differs from the licensed logical disk configuration of the computer entity.

BRIEF DESCRIPTION OF THE DRAWINGS

For a better understanding of the invention and to show how the same may be carried into effect, there will now be described by way of example only, specific embodiments, methods and processes according to the present invention with reference to the accompanying drawings in which:

FIG. 13 illustrates schematically process steps carried out by capacity management application 209 for setting a data storage application to store data according to a licensed logical disk configuration.

DETAILED DESCRIPTION OF THE BEST MODE FOR CARRYING OUT THE INVENTION

There will now be described by way of example the best mode contemplated by the inventors for carrying out the invention. In the following description numerous specific details are set forth in order to provide a thorough understanding of the present invention. It will be apparent however, to one skilled in the art, that the present invention may be practiced without limitation to these specific details. In other instances, well known methods and structures have not been described in detail so as not to unnecessarily obscure the present invention.

In this specification, the term "physical disk" is used to refer to a physically discreet data storage device, provided as a discreet hardware component, and having data storage capacity. A physical disk may include for example a rotating hard disk drive as is known in the art, or a static memory device, such as a Magnetic Random Access Memory device (MRAM).

In this specification, the term "logical disk" is used to describe an area of data storage capacity, physically contained on one or more physical disks, which is treated by a file system of the computer entity as being a single logical drive. For example in a Windows® environment, a logical drive may be given a drive letter e.g. A, B, C, D, E, F etc.

In this specification, the term "logical system disk" is used to describe a logical drive, in which operating system data and application data are stored.

In this specification, the term "logical data disk" is used to describe a logical disk which is used to store raw data, typically, but not exclusively, application data. Data may be stored in a logical data disk in the form of binary large objects (BLOBS).

Figure 1:
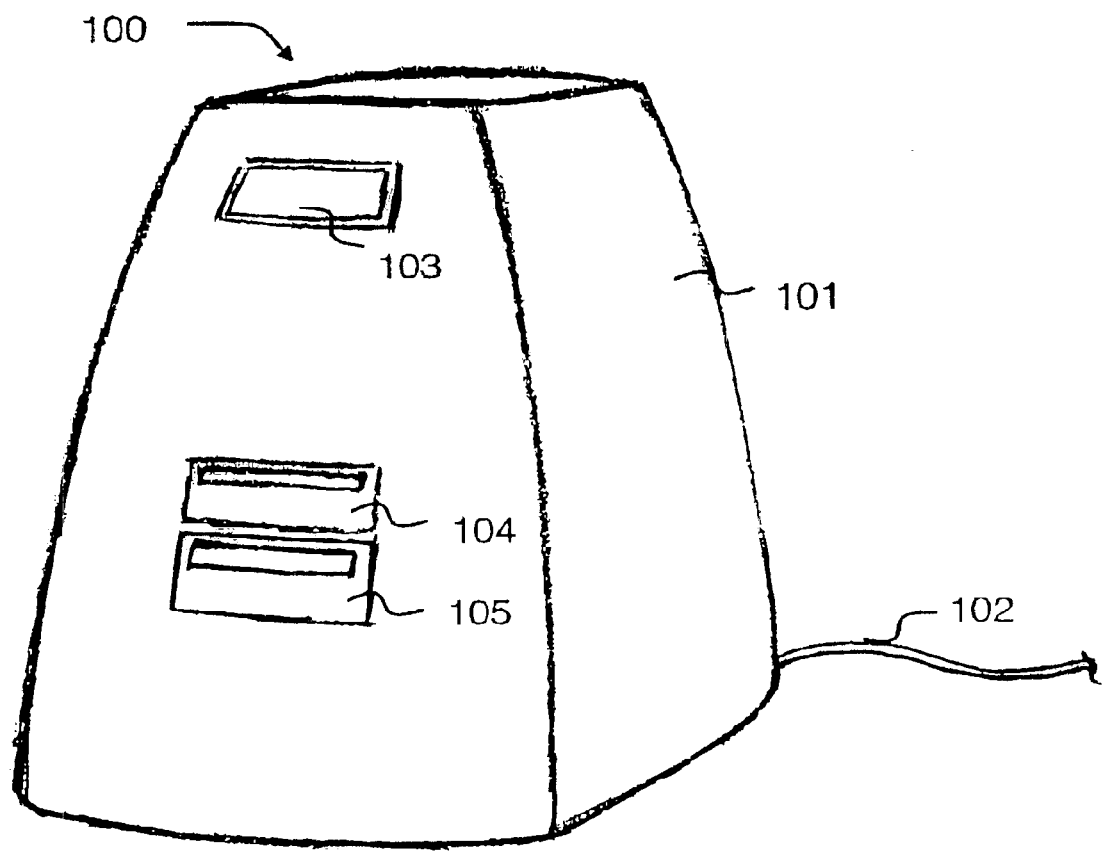
FIG. 1 illustrates schematically in external perspective view a headless computer entity according to a specific implementation of the present invention.

Referring to FIG. 1 herein there is illustrated schematically in perspective view a headless computer entity 100 comprising: a casing 101 containing a processor, memory, one or more data storage devices and one or more communications ports connectable to a local area network 102; a relatively small display screen, for example a liquid crystal (LCD) display 103 capable of giving limited status information for operations carried out by the computer entity, for example, POWER ON mode, a STAND BY mode, and fault modes of operation; a data entry means 104, for example a CD ROM drive, and optionally a back-up data storage device port 105, for example a digital data storage (DDS) format tape streamer.

The headless computer entity is not provided with a visual display monitor, pointing device e.g. mouse, or keyboard, or other direct user interface, and therefore is difficult for a human operator to interact with directly. In operation, the headless computer entity is intended to be self-managing and self-maintaining. Typically, a headless computer entity will provide a dedicated functionality within a network environment. Examples of headless computer entities include network attached storage devices.

Figure 2:
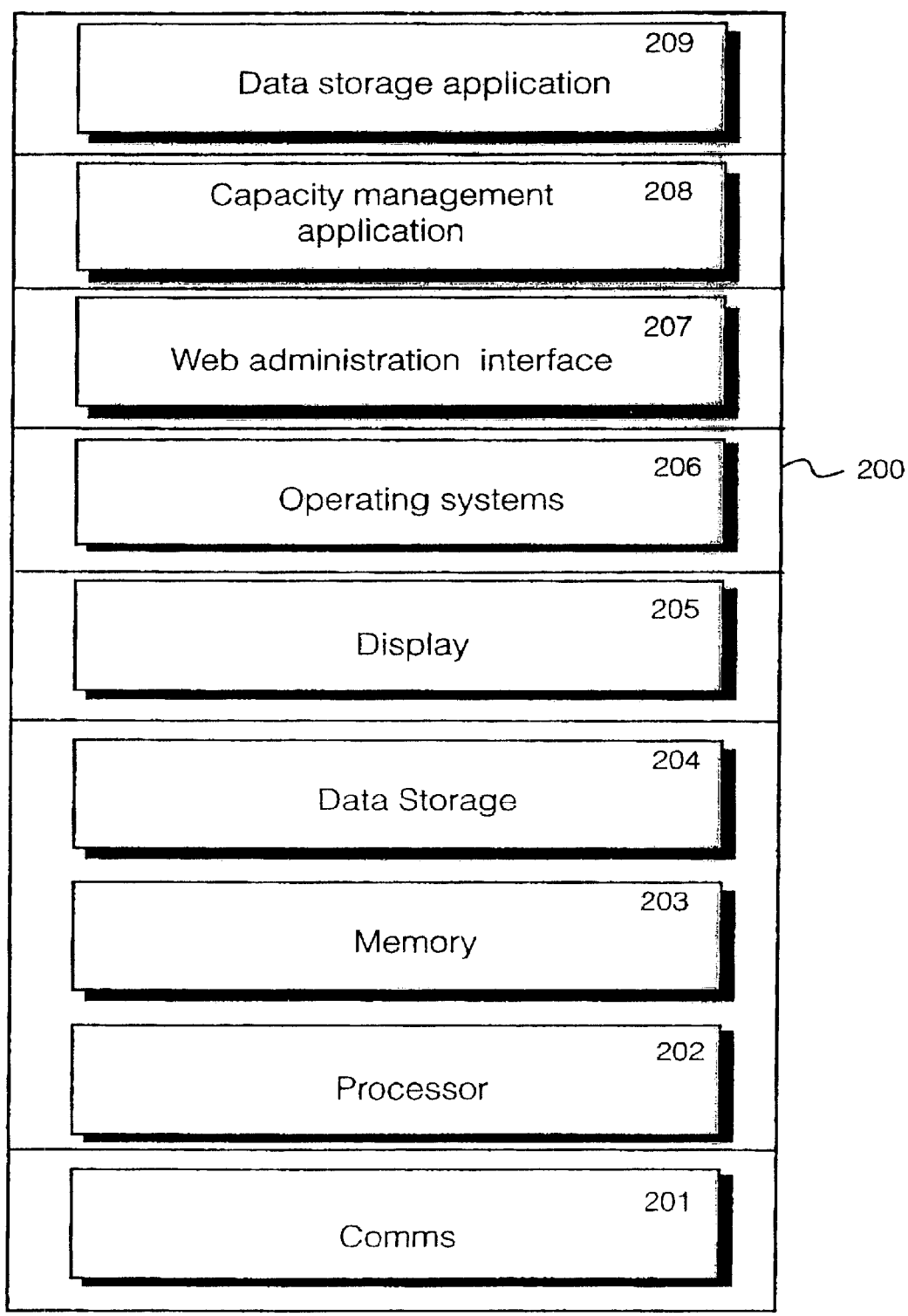
FIG. 2 illustrates schematically an architecture of a headless computer entity according to the specific implementation of the present invention.

Referring to FIG. 2 herein, there is illustrated schematically an architecture of hardware and firmware components of the headless computer entity 200 (corresponding to headless computer entity 100). The entity 200 comprises one or more communications ports 201; one or more data processing devices 202 as are known in the art; a memory 203 associated with the data processor(s) 202; at least one data storage device 204, for example a hard disk data storage device, or an array of a plurality of hard disk data storage devices; a small display, e.g. a liquid crystal display device 205; a plurality of operating systems 206 as will be described herein after; a web administration interface 207; a capacity management application 208 for managing access and use of the data storage capacity of the computer entity; and one or a plurality of application programs 209 providing functionality to the headless computer appliance.

The operating system 206 is stored on a non-volatile data storage device, for example a hard disk drive, or a RAID array.

The operating system 206 comprises a primary operating system, which controls the computer entity under normal operation; an emergency operating system which controls the computer entity at times when the primary operating system is incapable of running the computer entity, for example during a failure of the primary operating system, or during an upgrade or replacement of the primary operating system; and a copy of the primary operating system, comprising a copy of the code files comprising the primary operating system itself, and copies of default data of the primary operating system.

After a failure of the computer entity primary operating system or if the primary operating system is upgraded, or restored from a back-up data storage device, the primary operating system is restored directly from the copy of the primary operating system files and the default data of the primary operating system.

Figure 3:
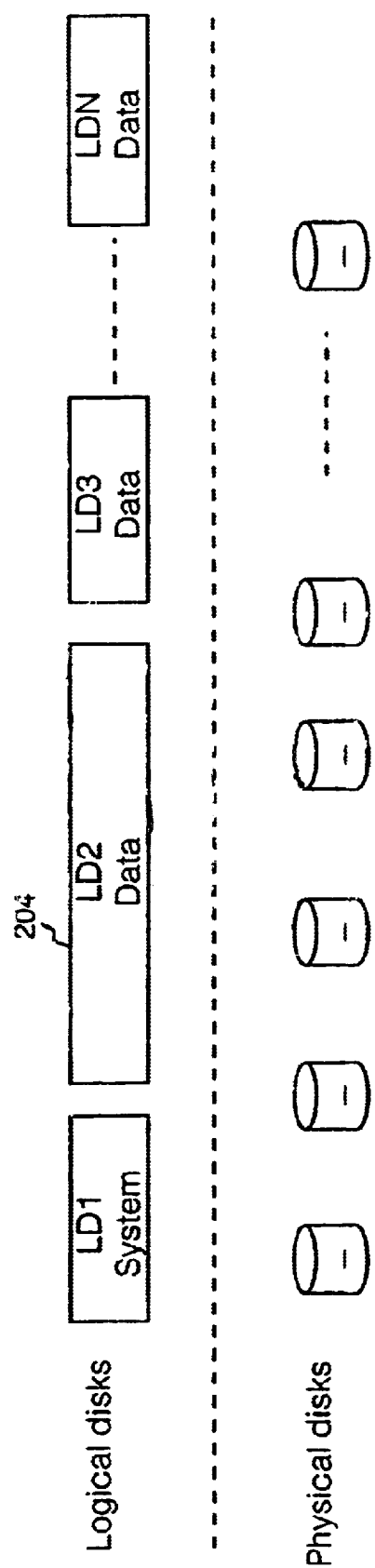
FIG. 3 illustrates schematically physical and logical disk layers within the headless computer entity structure of FIG. 2.

Referring to FIG. 3 herein, there is illustrated schematically data storage device 204 represented as a plurality of physical disks. In various embodiments, the data storage device may be implemented as a single physical data storage device eg a single rotating hard disk drive, or a single Magnetic Random Access Memory device, or as a plurality of physical disk drives, for example in a plurality of bays mounted on a back plane, in a RAID configuration under control of a RAID controller. The physical data storage devices are divided into a plurality of logical disks. In the case of a single physical data storage device, the logical disks are implemented as first and second partitions on a single physical data storage device. In an array of a plurality of physical data storage devices, one or more logical disks may be implemented as a system disk and one or a plurality of data disks, each implemented as data partitions.

Due to physical disk failure, any one physical disk drive may be become faulty and need to be replaced. Upon replacement of a physical disk drive, a later, higher capacity model may be provided as a replacement.

Figure 4:
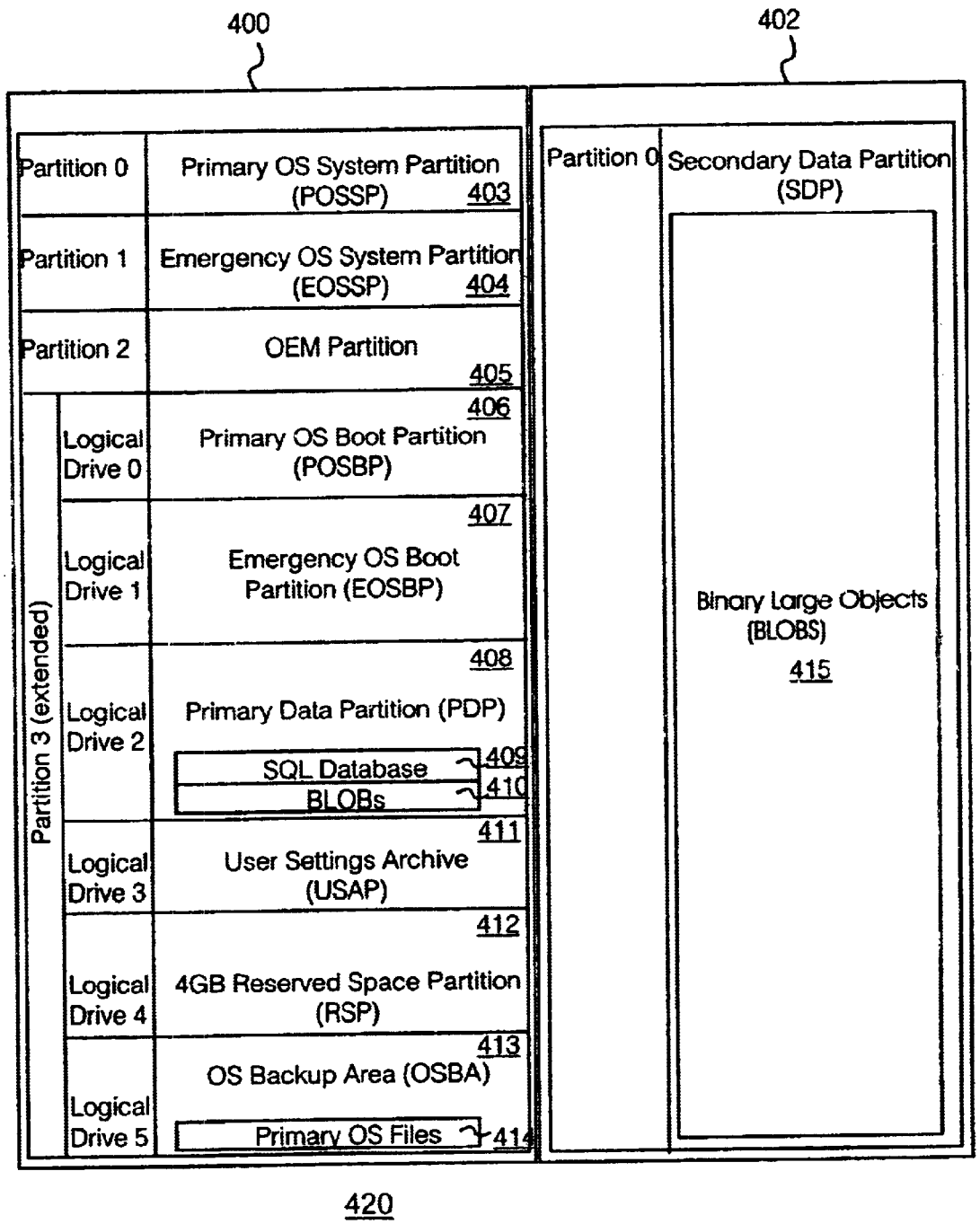
FIG. 4 illustrates schematically data partitioning of physical data storage capacity within the headless computer entity of FIG. 1.

Referring to FIG. 4 herein, there is illustrated schematically a format of data storage device 204, upon which operating systems 206 are stored. The data storage device is partitioned into a logical data storage area 420 which is divided into a plurality of partitioned areas of partitions and sub-partitions according to the architecture shown. The logical data storage area 420 is viewable by a file system on the computer entity. Area 420 is divided into a primary partition 400 and a secondary partition 402. Within the primary partition 400 are a plurality of sub partitions including a primary operating system system partition 403 (POSSP), containing a primary operating system of the computer entity; an emergency operating system partition 404 (EOSSP) containing an emergency operating system under which the computer entity operates under conditions where the primary operating system is inactive or is deactivated; an OEM partition 405; a primary operating system boot partition 406 (POSBP), from which the primary operating system is booted or rebooted; an emergency operating system boot partition 407 (EOSBP), from which the emergency operating system is booted; a primary data partition 408 (PDP) containing an SQL data base 409, and a plurality of binary large objects 410, (BLOBs); a user settings archive partition 411 (USAP); a reserved space partition 412 (RSP) typically having a capacity of the order of 4 gigabytes or more; and an operating system back up area 413 (OSBA) containing a back up copy of the primary operating system files 414. The secondary data partition 402 comprises a plurality of binary large objects 415.

Figure 5:
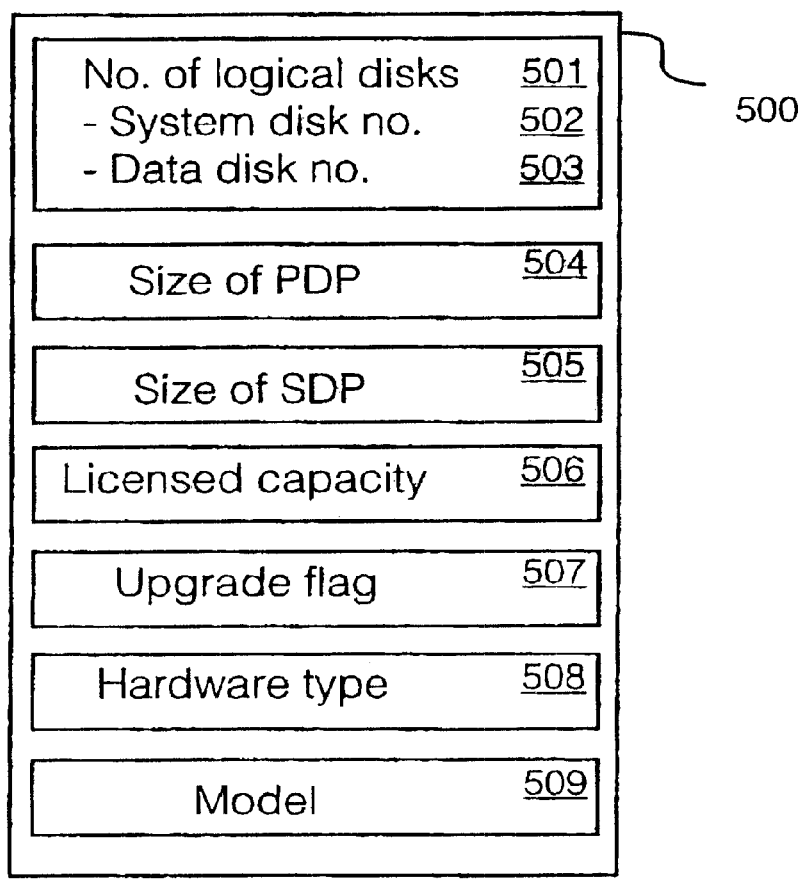
FIG. 5 illustrates schematically a license key data stored in a raw disk area of a data storage device of the headless computer entity.

Referring to FIG. 5 herein, there is illustrated schematically a license key data 500, which is stored on a raw disk sector of data storage device 204. The license key data comprises (1) (a) data 501 describing the number of logical disks resident on the computer entity, (b) the system disk number 502, and (c) the data disk number 503; (2) secondary data partition (SDP) size data 505 describing a memory capacity size of secondary data partition 402; (3) a primary data partition size data 504, describing the memory size of primary data partition (PDP) 400; (4) licensed capacity data 506 describing a data capacity size which a user is licensed to access on the computer entity; (5) an upgrade flag data 507; (6) hardware type data 508 describing the type of hardware installed in the headless computer entity 100, in particular a hardware data storage device type; and (7) model data 509 describing the model type and identification code identifying the particular type of model of headless computer entity 100.

Thus, the license key data records 500 at region 501 how many logical disks are resident on the computer entity, how those logical disks are partitioned, for example into a system disk (primary data partition) and a data disk (secondary data partition).

The license key is resident outside the file system, on the installed data storage device 204. Therefore, if the primary data partition and/or secondary data partition are erased for any reason, the license key, which remains outside those partitions, does not become erased. Any attempts to erase and re-format the primary operating system resident in primary operating system partition 403 will not affect the license key data, which is stored outside the file system containing the primary operating system. Consequently, if the primary operating system is erased and re-built, for example as a result of an upgrade, or as a consequence of a failure of the computer entity, then the license key data remains in tact and unchanged. The license key data is written to the data storage device once, during manufacture of the headless computer entity, and thereafter is not accessible or changeable, except with replacement of the complete data storage device by a complete new unit, containing a new license key data.

The license key data 500, in the best mode, is encrypted. The fact that the license key is stored outside of the computer entity file systems, and that the license key is encrypted, means that it does not need to be stored in any computer entity update software for update of operating systems, which may be introduced on a CD ROM carrier. Also in the event of an operating system rebuild being carried out following a fault condition of the computer entity, there is no need to reapply the license key data after the rebuild. The license key data maintains itself in a separate area of raw data storage space outside the logical system disk and data disk(s) of the computer entity.

Further, a public key/private key encryption is optimally fixed across different computer entity software builds, so that future major software updates, for example as introduced on a CD ROM carrier, do not have to update the license key data, and therefore this potential entry for hackers into the license key data remains closed.

Figure 6:
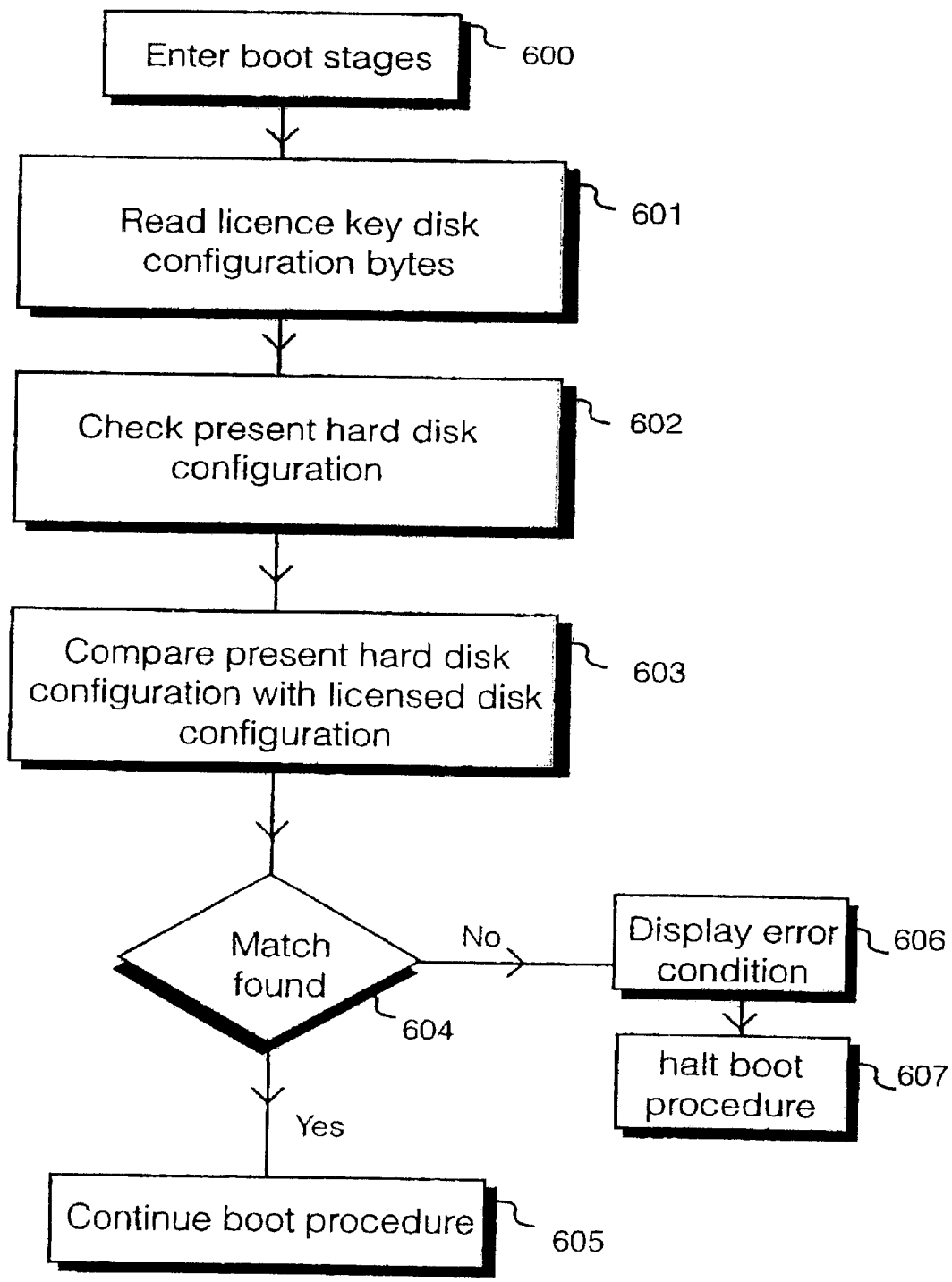
FIG. 6 illustrates schematically process steps carried out by a capacity management application for license enforcement of a headless computer entity.

Referring to FIG. 6 herein, there is illustrated schematically process steps carried out by capacity management application 208 during a boot-up procedure of operating system 206. The capacity management application 208 is called during a primary operating system boot-up procedure, to ensure that the computer entity is booted having data storage capacity according to the allowed licensed data storage capacity stored in the license key data 500. Following earlier boot stages 600 in the operating system boot-up procedure, in step 601, the capacity management application, having been called by the earlier boot stages reads the license key data configuration bytes 500 from the raw disk sector. In step 602, the capacity management application 208 checks the one or more installed physical disks in the headless computer entity to determine how many physical disks are present, how many logical disks are present, how many logical disks are designated as system disks, how many logical disks are designated as system disks, and how many logical disks are designated as data disks. In step 603, the capacity management application 208 compares the present hard disk configuration with the licensed disk configuration stored in the license key data 500. The checks include:

Whether the correct licensed number of physical disks are actually present.

Whether the correct number of licensed logical data disks are present.

In the case of a single licensed logical data disk, the licensed capacity of that data disk and whether that licensed capacity has been exceeded.

Whether the total licensed data storage capacity is exceeded by one or more logical data disks in the computer entity.

In step 604, as a result of step 603, the actual present data storage capacity available for use on the computer entity corresponds, within pre-determined limits, with the licensed allowable data storage capacity determined by the license key data 500, then in step 605 the operating system boot procedure continues, and control is returned to the primary operating system boot partition 406 to continue boot of the headless computer entity. However, if a violation of license key data 500 is found in step 604, then in step 606 an error condition is displayed on the web administration interface 207 and/or on the liquid crystal display 103 on the casing of the computer entity, alerting a user to the fact that a capacity license violation has occurred. In step 607, the operating system boot procedure is halted, preventing operation of the headless computer entity.

To recover from a capacity license violation, re-configuration of the physical disks must be made, and this is restricted by installation of a factory supplied replacement physical disks, which contains a pristine copy of a factory configured operating system and new license key data.

Figure 7:
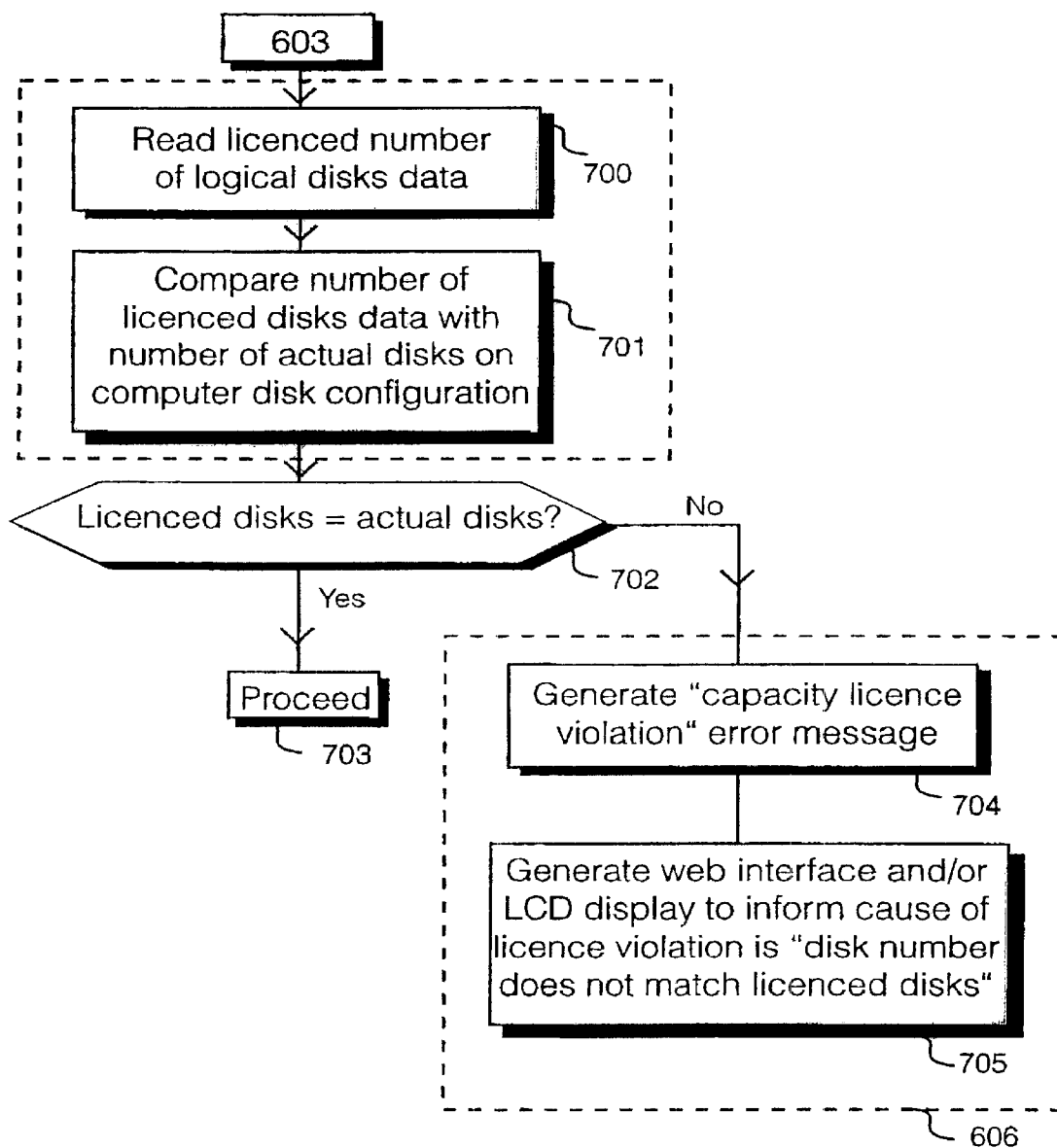
FIG. 7 illustrates schematically process steps carried out for enforcing a licensed number of logical disks.

Referring to FIG. 7 herein, there is illustrated schematically process steps carried out by capacity management application 208 that the headless computer entity boots up with an allowed number of logical disks. In step 700, the application reads from the key data, the licensed number of logical disks data 501, comprising a licensed number of system disks data 502 and a licensed number of data disks data 503. In a basic set up, as illustrated in FIG. 3 herein, one system disk and one data disk are permitted, giving a licensed limit of two logical data disks. In step 701, the application compares the number of licensed logical disks with a number of actual logical disks found on the computer hardware as a result of checking the hard disk configuration in step 602. In step 702, if the number of licensed logical disks is the same as the number of actual logical disks found on the computer entity, then the boot procedure continues in step 703, subject to any other checks to be made by the capacity management application 208. However, if the number of logical disks found in the computer entity is not the same as the licensed number of logical disks, for any reason, that is either fewer logical disks are found or more logical disks are found than the licensed number of logical disks, then in step 704 the application generates an error message indicating there is a capacity license violation. In step 705, the application generates a web interface display and/or a display on the liquid crystal display 103 on the casing of the computer entity, to inform a user of the cause of the licensed violation. Typically a message such as "disk number does not match licensed disks" may be displayed.

Figure 8:
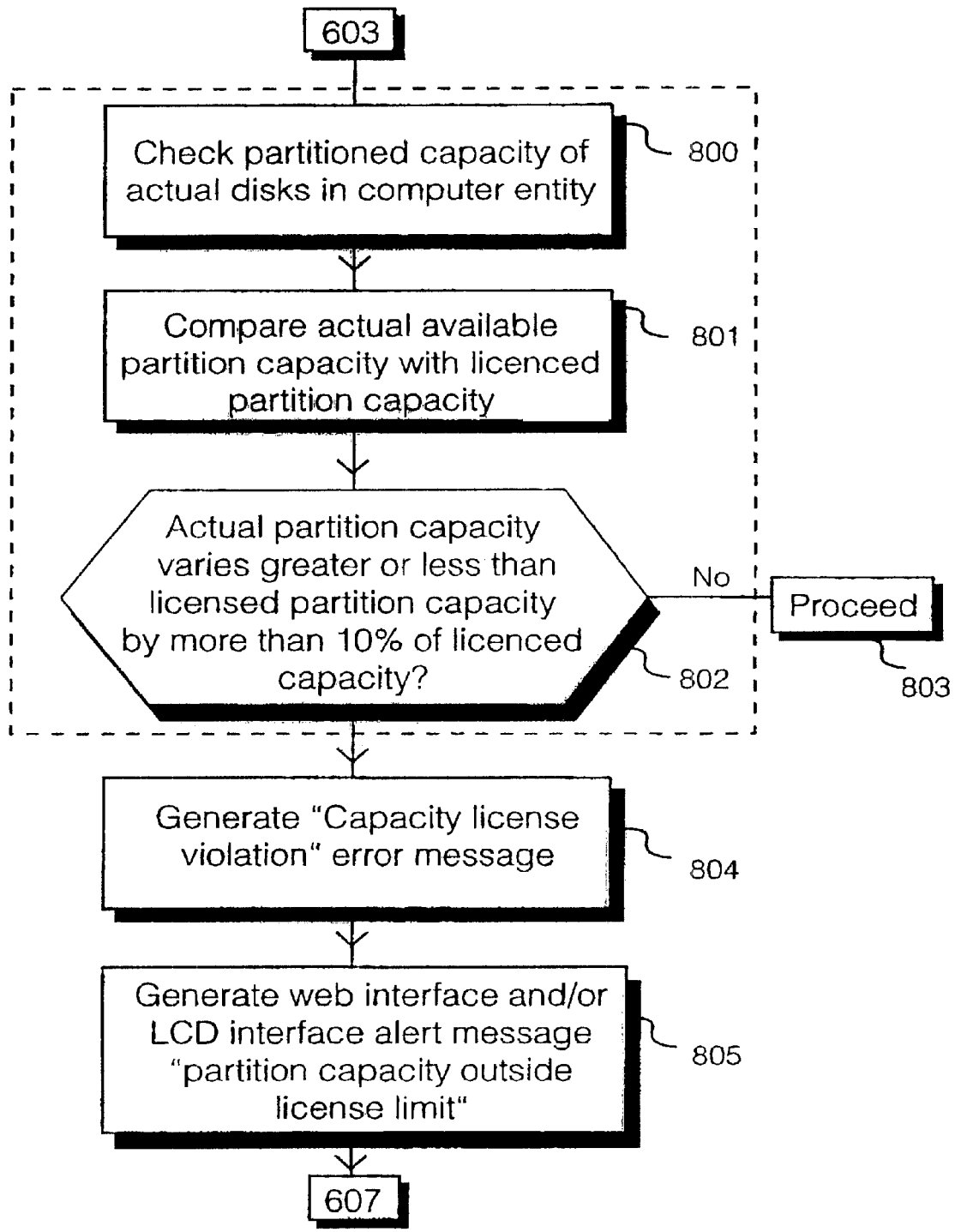
FIG. 8 illustrates schematically process steps carried out for enforcing an overall licensed data storage capacity.

Referring to FIG. 8 herein, there is illustrated schematically process steps carried out by capacity management application 208 for enforcing the overall data storage capacity limit specified by licensed capacity data 506, which includes system disk capacity and data disk capacity. In step 800, the application checks the partitioned capacity of the actual logical disks found in the computer entity. In step 801, the actual available partitioned logical disk capacity is compared with the licensed logical disk capacity. In step 802, if the result of the comparison of step 801 is that the actual partitioned logical disk capacity of the logical disks on the computer entity varies from the licensed logical disk capacity by plus or minus more than 10% of the licensed capacity, then in step 804 the application generates an error message that the capacity license has been violated, and in step 805 generates a web interface message and alternatively or additionally, a liquid crystal display interface alert message that the partitioned capacity is outside the licensed limit. In this case, the operating system boot procedure is halted and the computer entity cannot be booted.

However, if in step 802 the actual partitioned logical disk capacity is found to be within a pre-determined limit of the licensed logical disk capacity (for example within plus or minus 10% of the licensed logical disk capacity), then boot of the computer entity is allowed to proceed in step 803, subject to any other checking processes carried out by the capacity management application.

Figure 9:
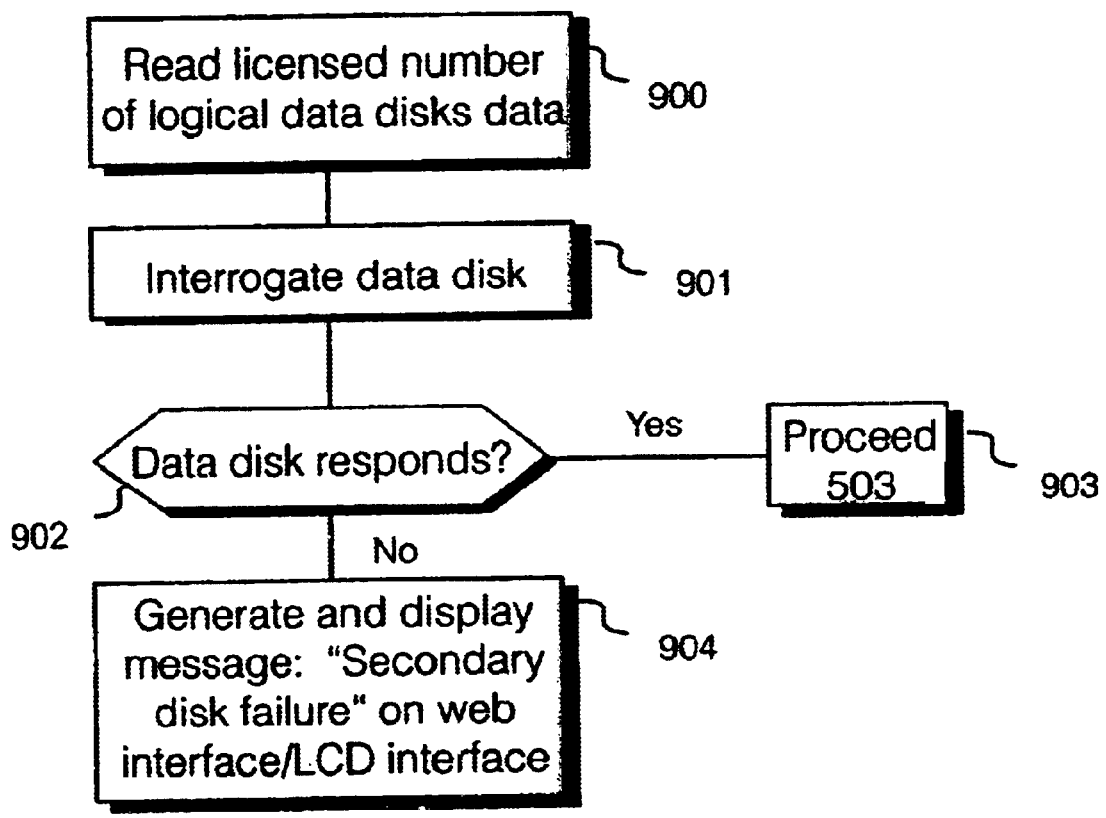
FIG. 9 illustrates schematically process steps carried out for checking whether a second logical disk (a data disk) exists on a headless computer entity.

Referring to FIG. 9 herein, there is illustrated schematically process steps carried out by capacity management application 208 to determine whether a logical data disk is present. In step 900, the application reads the licensed number of logical data disks data 503. In step 901, the application interrogates all physical disks present in the computer entity, searching for a logical data disk. In step 902, if a response is obtained from one or more logical data disks within the computer entity, then in step 903, the computer entity proceeds with the operating system boot procedure, subject to any other checks being carried out by the capacity management application 208. However, if in step 902 there is no response from any logical data disk, then in step 904 the application generates and displays an alert message to a user, that there is a secondary disk failure. This message is displayed on the web administration interface and/or on the liquid crystal display interface on the casing of the computer entity. Where a secondary disk failure occurs, boot of the operating system is halted, pending maintenance action being carried out.

Figure 10:
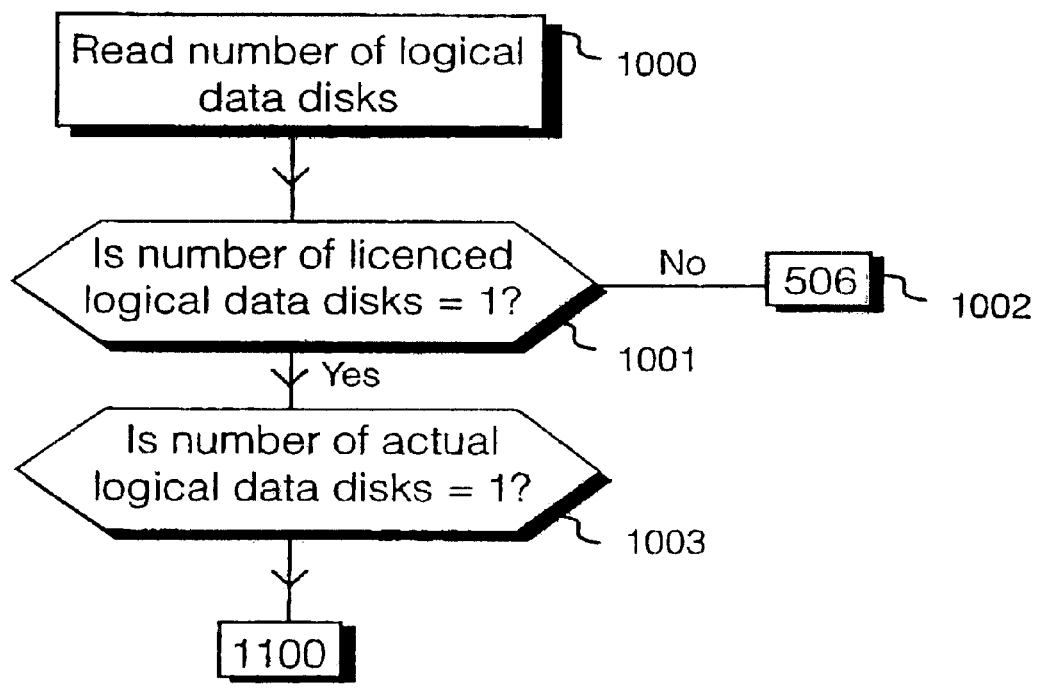
FIG. 10 illustrates schematically process steps carried out for determining whether a single data disk is licensed.

Referring to FIG. 10 herein, there is illustrated schematically a sub-routine carried out by the capacity management application 208 to determine whether an allowed number of logical data disks is one, and if so, to activate a procedure for checking a data storage capacity limit on that data storage device.

In step 1000, the application reads the number of logical licensed data disks data 503 from the license key data 500. In step 1001, the application checks a number of licensed logical data disks actually found in the computer entity as a result of step 602 in which the hard disk configuration was checked, and determines whether the number of actual logical data disks in the computer entity is equal to one. If not, then this could be because there are either no logical data disks, or more than one logical data disks and the application proceeds to other routines in step 903 to deal with these two cases. However, if the number of logical data disks is found to be one in step 901, being the same as the number of licensed logical data disks, then the application proceeds to check whether that single logical data disk has a data capacity within allowed limits.

Figure 11:
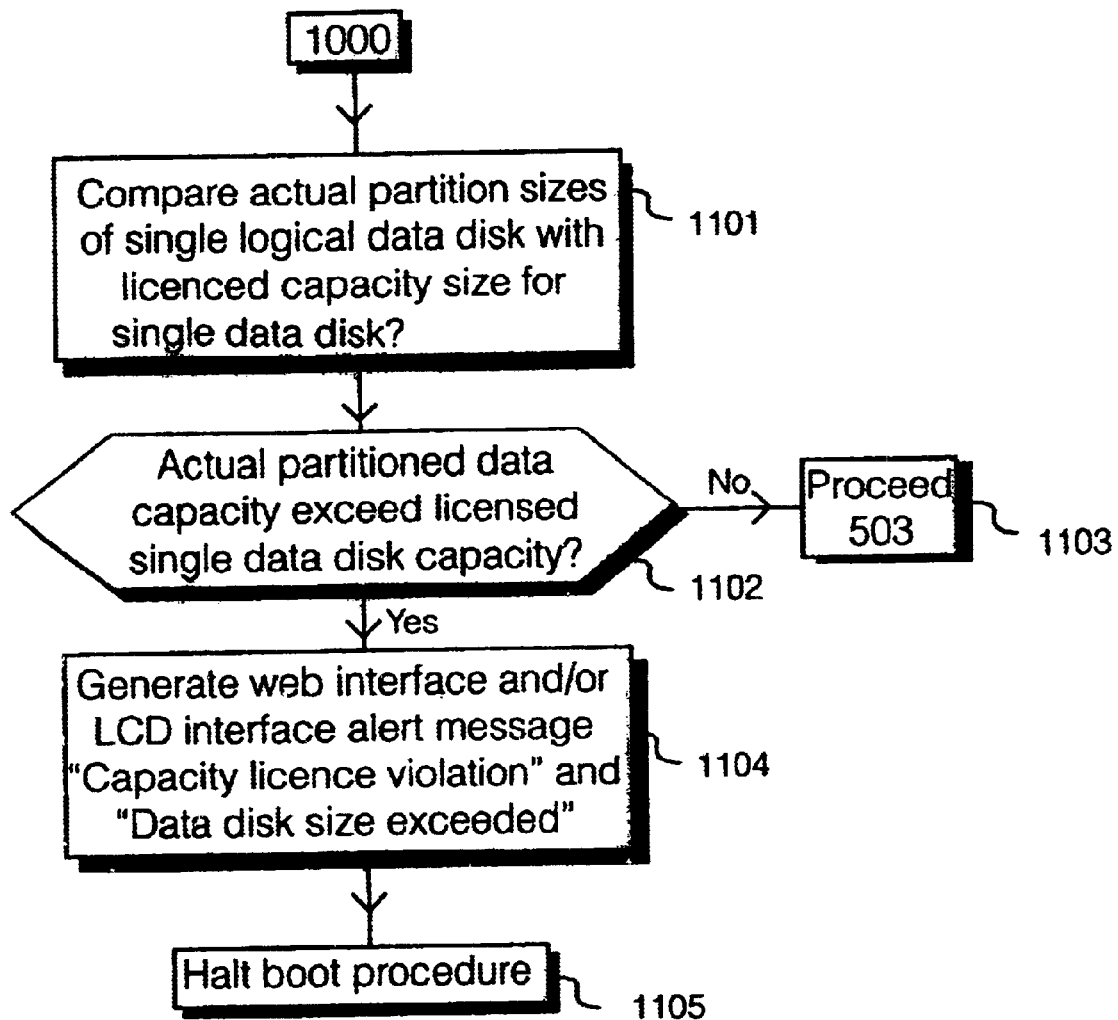
FIG. 11 illustrates schematically process steps for enforcing a maximum data partition size on a single logical data disk.

Referring to FIG. 11 herein, there is illustrated schematically process steps carried out by the capacity management application 208 to check that a single logical data disk found on the headless computer entity is within a data storage capacity limit for that single data disk, as specified in the key data 500. In step 1101, the application compares the actual found partition sizes of a single logical data disk on the computer entity, with a licensed capacity size data for a single data disk read from the licensed capacity data 506. In step 1102, the algorithm compares the actual data capacity of the single logical data disk with the allowed capacity for a single logical data disk and if the actual found partitioned capacity within a file system of the single logical data disk is within pre-determined amounts (for example plus or minus 10%) of the licensed single data disk allowed capacity read from the license key data 500, then in step 1103 the operating system boot procedure continues, subject to any other checking processes to be carried out by the management application 208. However, if in step 1102, there is found a logical data disk on the computer entity which has a partitioned capacity which is outside the pre-determined licensed limits (for example more than 10% greater than the licensed capacity for a single data disk, or less than 10% lower than the licensed single data disk capacity, then in step 1104, the application generates an alert message which is displayed on the web administration interface and/or liquid crystal display on the casing of the computer entity, alerting the user that a capacity license violation has occurred, and also alerting the cause of that violation, for example that the data disk capacity has been exceeded. In step 1105, the boot procedure of the operating system is halted pending maintenance of the computer entity being carried out. Maintenance of computer entity is by installation of a replacement physical disk drive containing pre-stored system disk and data disks, and having new license key data.

Figure 12:
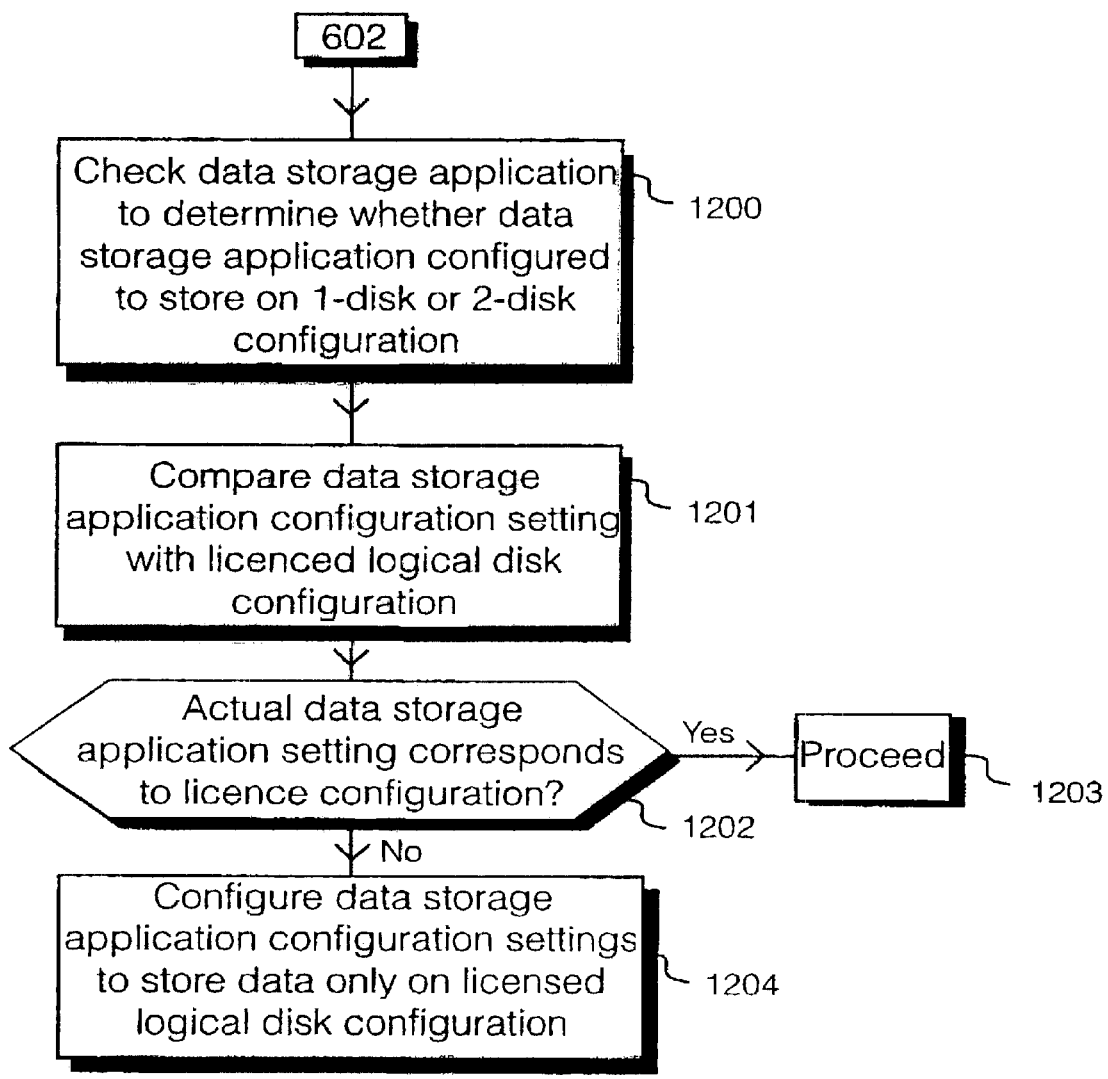
FIG. 12 illustrates schematically various product configurations based upon differing hardware configurations, where product upgrade paths are available based upon a common hardware platform.

Referring to FIG. 12 herein, there is illustrated schematically process steps carried out by capacity management application 208 for setting application configuration settings of a data storage application 209 to store data in a logical disk configuration allowable according to the licensed key data 500. In step 1200, the data storage application is checked to determine whether the data storage application is configured to store on either a one logical disk or two logical disks configuration. In step 1201, the application configuration settings are compared with the licensed logical disk configuration. For example if the license logical disk configuration is one logical disk, but the application is configured to store data on two logical disks, then in step 1202 the actual data storage application settings do not correspond to the licensed configuration, in which case in step 1204 the capacity management application configures the data storage application configuration settings to store data only on the licensed logical disk configuration, in this case one logical disk. However, if in step 1202 the actual data storage application settings correspond to the logical disk configurations contained in the licensed key data 500, then in step 1203, the boot procedure continues, subject to any other checks being carried out by the capacity management application 209.

If the application settings are different from the base license key allowable settings, then the application software is automatically re-configured by the capacity management application to store application data on the correct number of disks, so that this coincides with the number of logical disks allowed by the license key data 500. This scheme is used so that a single common update CD ROM carrier can be produced which can be used on both single logical disk and twin logical disks headless computer entity configurations. After the CD ROM update is applied, the application software can automatically modify its application data locations to match the actual appliance configuration according to the update.

Over a product range of headless computer entities, a same hardware may be used across each type of headless computer entity product, with differentiation between products occurring in the data storage capacity of the individual computer entity, which is controlled by the license key data at the point of manufacture. For example in a system where different product ranges are designated PC 25, PC 100, PC 300, and PC 1000 respectively a same hardware may be used to differentiate products to the storage capacities and configurations as illustrated in FIG. 13 herein. In this case, the PC 100 product has 40 GBytes of data storage capacity provided on a second logical disk (data disk) a PC 300 product has 300 GBytes of data capacity provided on a RAID 5 volume, where the RAID 5 volume as a whole is a second logical disk in addition to a system disk. A PC 1000 product may have 700 GBytes of data storage capacity provided on a RAID 5 volume, as a second logical disk.

In each of the PC 25, PC 100, and PC 300, and PC 1000 products, each product has two logical disks, one being a system disk and one being data disk respectively, with the logical data disk partitioned into a single data partition, having a capacity based on the base capacity license data 506 specifying the maximum data storage capacity of the single data disk partition.

Replacement of a logical data disk by a larger logical data disk may occur where for example there is a physical disk failure, and the physical disk is replaced with a (higher manufactured data capacity) replacement physical disk, for reasons of cost effectiveness and manufacturing efficiency. However, under these conditions the license key restricts the amount of that potentially available capacity which can be actually partitioned for use as a logical data disk.

If a physical disk is replaced with a larger capacity physical disk, the data partition created on the larger capacity physical disk is the same size as the original data partition on the original data disk. This leaves free space on the larger capacity physical disk, configured as a logical data disk, which is never used by the computer entity.

Therefore, control of upgrade of data capacity may be passed to the manufacturer, rather than being capable of circumvented by the user of the headless computer entity, and manufacturers may structure product pricing according to licensed capacity on a hardware platform, rather than basing pricing on the provision of hardware components themselves.

Provision of a capacity license key data 500 may provide various advantages for headless computer entities having fixed disk capacity as follows:

The license key data may ensure that users cannot add a pre-formatted extra disk to a computer entity, and thereby gain extra data storage capacity, without reference back to the manufacturer.

The license key data ensures that after a physical disk replacement, a headless computer entity is still restricted to use an original number and capacity of logical disk, so if a user replaces a physical disk with a larger capacity physical disk, then only the original authorized data capacity specified by the license key data will be used on the replacement physical disk. This has the added benefit that computer entity tape backups will be compatible with any past and future computer entities, regardless of the size of the physical hardware disk, since the actual logical data partition stored on the back-up tape will always be the same size.

The license key data is stored in a raw disk sector of the computer entity so that it is not affected by any operating system software updates introduced on a carrier e.g. CD ROM, and thereby avoiding a potential security hole which could be introduced if the license key data were included as part of a software update provided on a carrier e.g. CD ROM.

The license key data allows the use of a common operating system or application upgrade on a carrier e.g. CD ROM, for computer entities having both one logical disk divided into two partitions, and two logical disks.

What is claimed is:

1. A memory for a computer, the memory comprising:
a file system including a program storing an operating system for controlling operation of the computer, and
a license key resident outside the file system, the license key including an indication of licensed user storage capacity of the computer, the license key being incapable of being changed during operation of the computer, the license key being incapable of being changed as result of changes of the file system.

2. The memory of claim 1 wherein the license key is encrypted.

3. A computer comprising:
a processor, and
a memory including a file system and a license key including an indication of licensed user storage capacity of the computer;
the processor being arranged to be coupled with the memory for (a) causing the file system to control operation of the processor and (b) preventing further operation of the processor in response to the licensed user storage capacity being exceeded or substantially exceeded;
the processor and memory being arranged so the license key is incapable of being changed during operation of the computer, the processor and memory being arranged so the license key is incapable of being changed as result of changes of the file system.

4. The computer of claim 3 wherein the license key is resident outside the file system.

5. The computer of claim 4 wherein the license key is encrypted.

6. The computer of claim 3 wherein the license key is encrypted.

7. The computer of claim 3 wherein the computer is a headless computer.

8. The computer of claim 3 further including a display coupled with the processor and memory, the display being arranged to be activated to display a message in response to the licensed user capacity being exceeded or substantially exceeded.

9. The computer of claim 3 wherein the computer and memory are arranged so that during boot-up the processor is arranged for (a) comparing the actual and licensed capacity and (b) preventing further operation of the processor after boot-up in response to the comparison indicating the actual capacity exceeding or substantially exceeding the licensed capacity.

10. The computer of claim 3 wherein the computer and memory are arranged so that further operation of the processor is prevented in response to the actual capacity being substantially different from the licensed capacity.

11. A method of operating a computer including a processor and a memory, the memory including a file system and a license key including an indication of licensed user storage capacity of the computer, the method comprising:
causing the file system to control operation of the processor;
preventing further operation of the processor in response to the licensed user storage capacity being exceeded or substantially exceeded;
preventing the license key from being changed during operation of the computer; and
preventing the license key from being changed as a result of changes of the computer file system.

12. The method of claim 11 wherein the computer includes a display, and further including displaying a message on the display in response to the licensed user capacity being exceeded or substantially exceeded.

13. The method of claims 11 further including comparing the actual and licensed capacity during boot-up, and preventing further operation of the processor after boot-up in response to the comparing step indicating the actual capacity exceeds or substantially exceeds the licensed capacity.

14. The method of claim 13 wherein the computer includes a display, and further including displaying a message on the display in response to the comparing step indicating the actual capacity exceeds or substantially exceeds the licensed capacity.

15. The method of claim 11 further including preventing operation of the processor in response to the actual capacity being substantially different from the licensed capacity.

16. A method of operating a computer entity having an actual configuration, a licensed configuration, plural logical disks, and an applications program, said method comprising the steps of:
determining the actual configuration;
storing license data describing the licensed configuration of said computer entity;
determining whether said determined actual configuration of said computer entity lies within said licensed configuration, within predetermined limits;
determining the number of logical disks for which said application program stores application data by interrogating the applications program of the computer entity;
comparing said predetermined number of logical disks used by said applications program with a licensed number of logical disks according to said licensed data; and
reconfiguring said applications program to use the same number of logical disks as said licensed number of logical disks in response to the comparing step indicating said predetermined number of logical disks in said applications program exceeds or substantially exceeds said licensed number of said logical disks according to said licensed data.

17. The method of claim 16 wherein said applications program is reconfigured to use the same number of logical disks as said licensed number of logical disks in response to the comparing step indicating said predetermined number of logical disks in said application program differs from said licensed number of said logical disks by more than a predetermined percentage.

18. A method of controlling a computer entity having at least one data processor, at least one storage device including disks for which licenses are required, and at least one applications program storing application data about the disks; the method comprising the steps of:
determining the configuration of the disks by checking said applications program;

comparing said application disk configuration with a licensed configuration of said disks; and changing configuration settings of said applications program to correspond with said licensed logical disk configuration of said computer entity in response to said applications program being configured to use a logical disk configuration which differs from said licensed logical disk configuration of said computer entity.

* * * * *